April 5, 1932.   C. C. BROWN   1,852,553
LIQUID FUEL CONSUMPTION INDICATOR
Filed Nov. 30, 1927    2 Sheets-Sheet 1
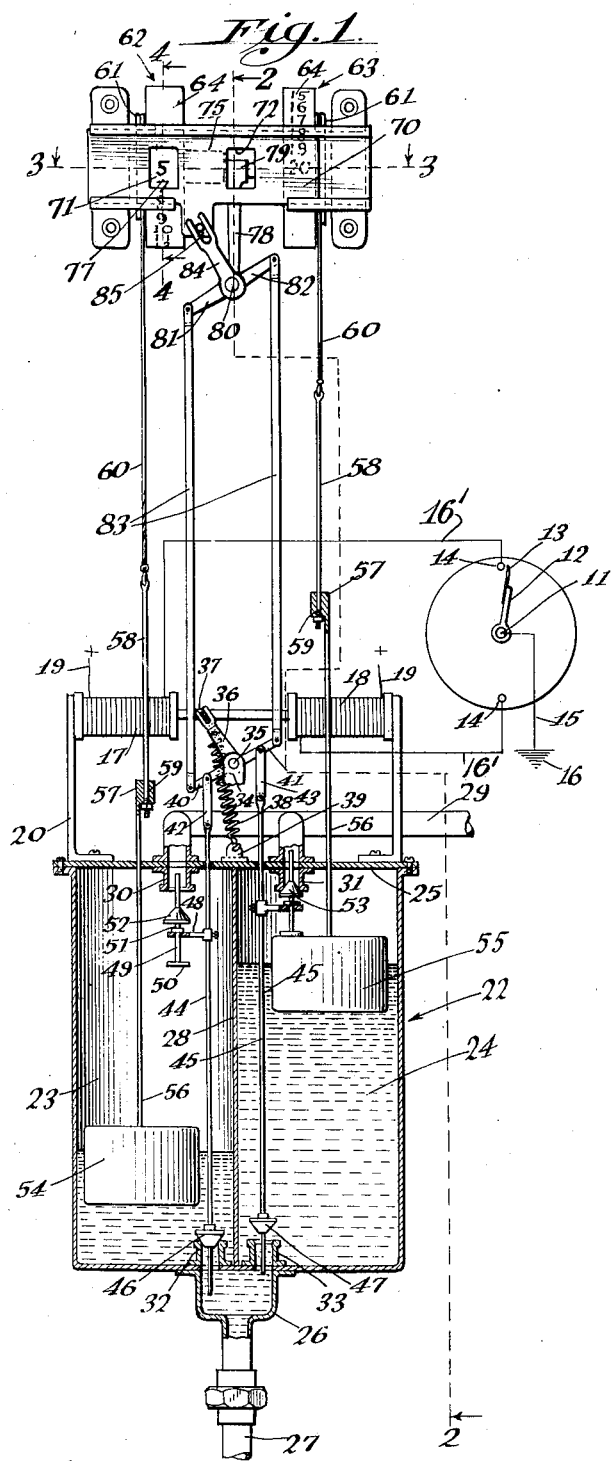
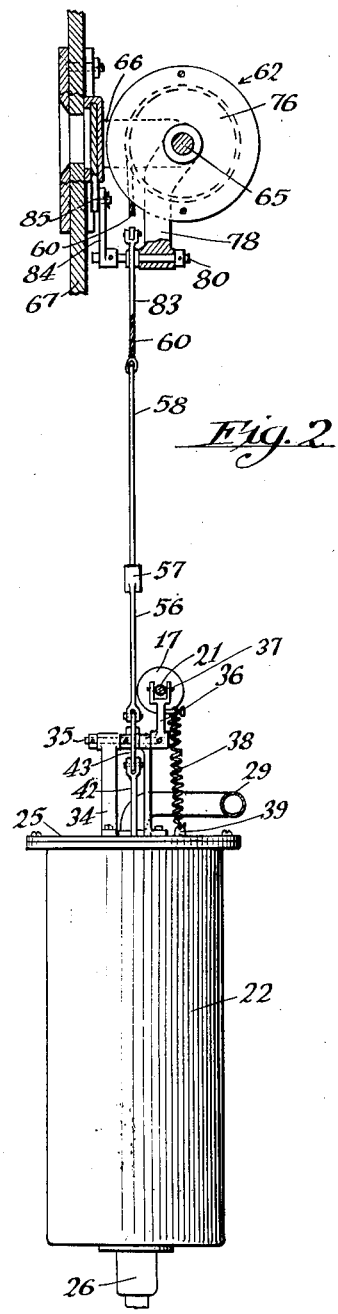
Inventor.
Claude C. Brown
by Hazard and Miller
Attorneys.

April 5, 1932.  C. C. BROWN  1,852,553
LIQUID FUEL CONSUMPTION INDICATOR
Filed Nov. 30, 1927  2 Sheets-Sheet 2
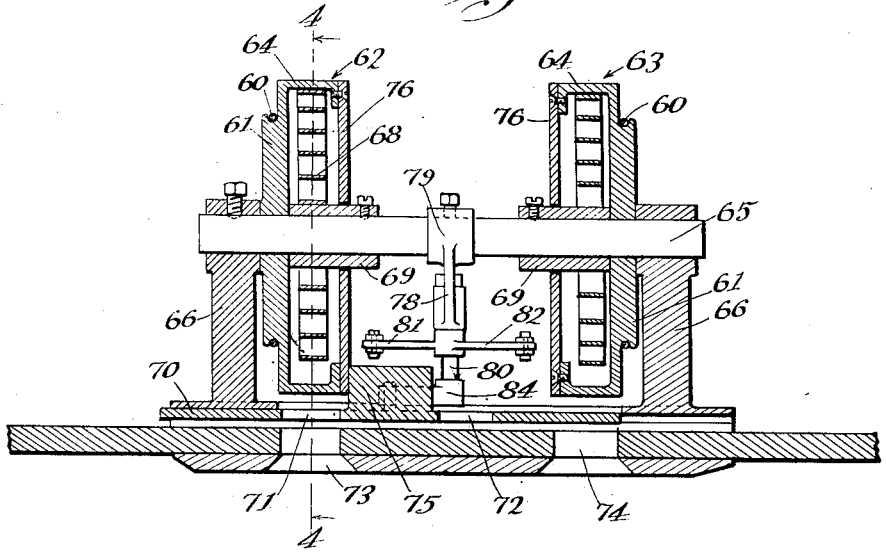
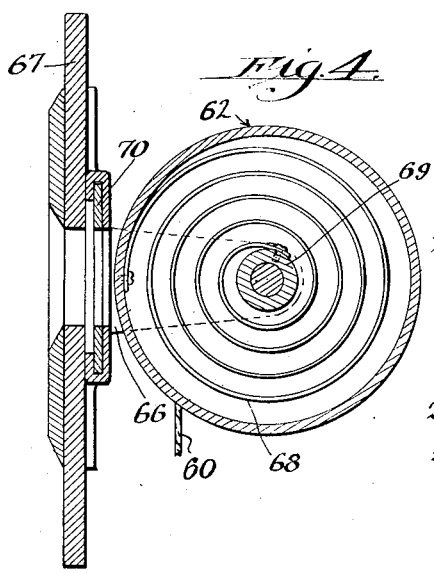
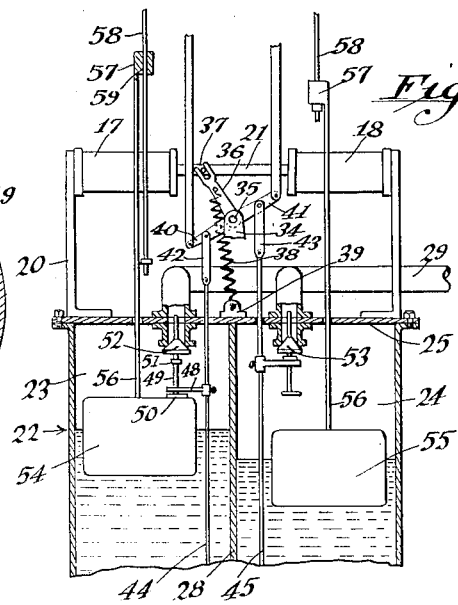
Inventor
Claude C. Brown
by Hazard and Miller
Attorneys Patented Apr. 5, 1932

1,852,553

UNITED STATES PATENT OFFICE

CLAUDE C. BROWN, OF LOS ANGELES, CALIFORNIA

LIQUID FUEL CONSUMPTION INDICATOR

Application filed November 30, 1927. Serial No. 236,738.

My invention comprises a liquid fuel consumption indicator.

The invention of my present indicator, has for an object giving an indication of the rate of using liquid fuel in accordance with distance traveled. The indicator may be calibrated to show a distance which may be traveled on a designated unit of fuel at a certain rate of consumption, such as so many miles travel to the gallon of fuel or kilometers to the liter of fuel, etc. Or the device may be calibrated to show the units of fuel used in a unit of distance, as the number of gallons and fractions thereof used in a mile travel, or the number of liters of fuel used in a kilometer travel, etc.

An object of my invention is an indicator which may be utilized with a number of different types of vehicles and give an indication of the rate at which fuel is being used to drive such vehicle. For instance, if the vehicle is an automobile, the indicator, as above mentioned, may show the number of miles per gallon, or kilometers per liter that could be traveled at any particular time in which the indicator is examined. The device may also be applied to aeroplanes and give a similar indication, but in this case it would be relative to the air speed. In this connection the indicator would show the number of air miles traveled on a gallon of fuel or kilometers on a liter of fuel, or the graduation could indicate the number of gallons or fractions used in traveling an air mile or the number of liters used in traveling an air kilometer.

This present invention operates on the proportion of the amount of fuel used per unit of distance, this being registered in any suitable terms for interpretation.

My application for a liquid fuel consumption indicator, Serial No. 236,739, operates by utilizing a unit quantity of fuel having the register operate in the relation of distance per unit of fuel.

The device may also be utilized on ships and connected to the engines showing the consumption of fuel in relation to the distance traveled by the ship through the water.

In the present invention I employ a suitable mechanism connected with the operating part of a vehicle so that on a predetermined distance of travel either over the ground, through the air or in water, the device is actuated to give an indication which, as above mentioned, may be calibrated in the various manners set forth. For instance, the device may, at each mile or half mile or other predetermined distance of travel, be actuated to give the indication, and such indications would probably be at sufficient intervals to allow the operator of a vehicle or the person in control of an engine to know if this were operating to the best advantage.

My liquid fuel consumption indicator may be utilized for internal combustion engines in which the explosive fuel passes through the indicator and operates same, or it may be utilized in connection with steam boilers which are fired by a liquid fuel.

In the present construction I employ a pair of liquid fuel chambers, each having an inlet and an outlet controlled by separate valves. A trip mechanism, preferably electrically controlled on a predetermined distance of travel of the vehicle, is actuated to close the outlet valves of each chamber or compartment alternately, and at the same time to open one inlet valve, the other being closed. The fuel is designed to flow into the chambers much faster than it can flow out, whereby a float in each chamber closes the inlet valve before the outlet valve for the other chamber is closed, it being understood that the outlet valve for each chamber is closed while its inlet valve is open.

The floats in each chamber are connected to registering dials or the like and on the downward movement of each float, due to the consumption of fuel from the particular chamber in operation, the dial is turned. The dial that is being moved, however, having a gradual movement does not give the immediate registration; but this is done by a dial which is held stationary during the filling of the tank or chamber to which said stationary dial is connected by a float. Thus at every predetermined unit of travel, an indication is given of the rate of fuel consumption. While this does not give an absolutely continuously fluctuating registration, it is sufficient to determine the efficiency of operation of the propelling mechanism for the vehicle and to gauge the rate at which fuel is being used.

My invention will be more readily understood from the following description and drawings, in which:

Figure 1 is a vertical section through the liquid chambers or tanks showing in elevation the registration dials with the visible indications showing.

Fig. 2 is a vertical section on the line 2—2 of Fig. 1 in the direction of the arrows showing the liquid chambers in elevation.

Fig. 3 is a horizontal section substantially on the line 3—3 of Fig. 1 through the dials and a shifting plate having exposure apertures.

Fig. 4 is a vertical section on the line 4—4 of Figs. 1 or 3 in the direction of the arrows showing the registration device and the aperture plates.

Fig. 5 is a partial view similar to Fig. 1 showing the floats and inlet valves in slightly different positions.

Referring to Fig. 1, a rotatable shaft is indicated by the numeral 11. This is presumed to be connected to a registering device in connection with the vehicle; for instance, if the vehicle is an automobile, it may be connected to the speedometer or the wheels or transmission, so that the shaft may make one complete revolution in two units of distance, and it is presumed in a land vehicle that a half mile is sufficient for a unit of distance. If the device is used on an aeroplane, the shaft 11 would be connected to an air speed indicator so that it may rotate in accordance with the distance traveled through the air, the number of rotations, in accordance with distance, being such as may be found suitable. If the device is used on a vessel, the shaft 11 would be connected to a device giving the rate of travel of the vessel through the water.

Considering the invention installed on a vehicle such as an automobile, the shaft 11 is intended to indicate some part driven by the movement of the vehicle, such as a speedometer shaft or the equivalent.

The shaft 11 has an arm 12 connected thereto with a brush 13, which brush is adapted to engage electrical contacts 14 so that an electric current may pass through the lead 15 to the ground 16. Each of the fixed contacts 14 is connected by an electric lead 16' to solenoids 17 and 18. The windings of these solenoids are connected to a grounded source of power by leads indicated at 19. The solenoids are suitably supported on a frame 20 and have an armature shaft 21 operating in the course of the aligned solenoids, whereby this armature may be shifted from one side to the other, in accordance with the energization of the particular solenoid.

I provide a tank 22 having a pair of liquid fuel chambers 23 and 24. The tank has a top 25 on which it is convenient to mount the frames 20. An outlet receptacle 26 is connected to the bottom of the tank and has a discharge pipe 27 connected thereto. The two chambers are formed in the tank by means of a partition 28.

The fuel supply to the engine of the vehicle or boilers is provided by a fuel pipe 29 which has branches leading to inlet valves 30 and 31. There are outlet valves 32 and 33 leading to the outlet receptacle 26.

These valves are mechanically controlled in the following manner: A bracket frame 34 is preferably suitably mounted on the top 25 of the tank and has a transverse rock shaft 35, to which is connected a rocker arm 36. This arm has a pin and slot connection 37 to the armature 21, and there is a toggle spring 38 connected between the arm 36 and a lug 39 on the top 25.

Oscillating levers 40 and 41 are rigidly connected to the rocker arm 36 and to each of these there is connected links 42 and 43, and depending from these links are valve rods 44 and 45 which pass downwardly through the top of the tank. Adjacent the lower end of these valve rods there are outlet valve plugs 46 and 47 which operate to close the outlet valves 32 and 33.

Adjustably mounted on each valve rod there is a bracket 48, each of which has a valve stem 49 slidably mounted therethrough. Each valve stem has a lower head 50 and a stop collar 51, and on each of these valve stems there is a valve plug 52 and 53 which form a closure respectively with the inlet valves 30 and 31.

The indicating mechanism involves the following features: A pair of floats 54 and 55 are located in each of the chambers, each having a float rod 56 connected thereto, such rods having a head 57 connected thereto. Links 58 are slidably mounted in said heads, the links being preferably screw-threaded at the lower end 59 and having adjusting nuts thereon. A cable 60 is connected to each of the links and attached to a reel 61 are indicating dials designated generally by the numerals 62 and 63.

The indicators comprise discs 64, each rotatably mounted on a shaft 65 supported on suitable journal arms 66, these arms being attached to a suitable supporting structure which may be the instrument panel of an automobile or other suitable panel. Each of the dials has a spring 68 interconnected between the dial and the shaft through the medium of a hub 69, these springs being wound by the unwinding of the cables 60. Slidably mounted behind the panel there is an aperture plate 70 having a pair of apertures 71 and 72 which are adapted to register with apertures 73 and 74 of the panel. The aperture plate also has a brake block 75 which is adapted to bear against a friction disc 76 secured to each of the dials. These dials are graduated with indicia 77 and in the instance shown such graduation is intended to indicate a certain number of miles per gallon of fuel as is the ordinary designation of the operation of a motor vehicle.

Depending from the structure carrying the dials there is a drop arm 78 which is illustrated as being attached by a collar 79 to the fixed shaft 65. This drop arm has a rock shaft 80 which has upper oscillating levers 81 and 82 connected by links 83 to the rock levers 40 and 41. A rock arm 84 is connected by a pin and slot connection 85 to the sliding aperture plate 70.

The manner of operation of my liquid fuel indicator is substantially as follows: In the mechanism as positioned in Fig. 1 it is presumed that the brush 13 has just made a contact with the fixed contact 14, the arm 12 being presumed to rotate in a clockwise direction. The solenoid 17 has therefore just been energized and has shifted the armature 21, thereby rocking the arm 36 to the position illustrated. This action, through the medium of the rock lever 40 and 41 actuates the valve rods 44 and 45, thrusting the valve plug 46 into a position closing the valve 32 and raising the valve plug 47, thus opening the valve 33. At the same time the bracket 48 on the rod 44 has moved downwardly, thereby allowing the valve plug 52 to open the valve 30, the collar 51 resting on the bracket 48; also at the same time, the bracket 48 on the other valve rod 45 has been moved upwardly and engages underneath the collar 51 of the stem 49 having the valve plug 53, thus maintaining the valve 31 closed.

Such valve has been previously closed in the following manner, referring to Fig. 5 showing the positions of the inlet valves and the floats shortly after the liquid has started to flow out of the chamber or receptacle 24. It is to be understood that the fuel is drawn off comparatively slowly through the outlet valves, the rate of flow from such valves being governed by the rate required by the engine or boilers, and the capacity of each of the chambers 23 and 24 should be such that they will hold sufficient fuel for the mechanism requirements in each of the unit distances of travel represented by the movement of the brush 13 between the contacts 14. However, the fuel flows into these receptacles 23 and 24 in large quantities so that they fill up rapidly, the filling being at such a rate that no matter how uneconomically the engine or boiler may operate, the receptacle which has been emptied is filled before the solenoids again function to trip the valves.

Hence, as shown in Fig. 5, the float 55 is gradually descending as the fuel is used, but the valve plug 53 maintains the valve 31 closed, the plug being held upwardly by its bracket 48 on the valve rod 45. As the receptacle which has been depleted is filled rapidly, the float 54 is illustrated as engaging the head 50 connected to the valve plug 52 and thrusting this upwardly into the position to close the valve 30. To accommodate this action the valve stems 49 must be of sufficient length between the heads 50 and the collar 51 to allow the valve to be thrust upwardly therethrough, as illustrated in Fig. 5.

From the above description it will be seen that as soon as the receptacle fills its inlet valve is closed, and when the oscillating levers 40 and 41 are swung over into the opposite position, the inlet valve of the receptacle filled is maintained closed.

The indicating mechanism operates substantially as follows: Presuming, as above mentioned, that the solenoid 17 has just been energized, as shown in Fig. 1, the dial 62 gives the indication of the rate of consumption of the fuel during the depletion of the receptacle 23, in that the oscillating levers 81 and 82 have been shifted to the position shown in Fig. 1; and through the medium of the rock arm 84 the slidable aperture plate 70 has been shifted into the position shown in Figs. 1 and 3, thus exposing the indicia 77 graduated in miles per gallon. In the present instance this indicates the figure 5 which is intended to indicate that the vehicle had been consuming fuel at the rate of 5 miles to a gallon of fuel. In this same action the brake block 75 is brought to bear against the brake disc 76 on the dial 62 and holds this stationary. Therefore on the rising movement of the float 54, the head 57 slides upwardly on the link 58 slidable therethrough as illustrated in Fig. 5, but this figure or indicia 77 remains exposed until the next action of the device.

While the receptacle 24 is being emptied, the float 55 moves downwardly and as the brake block 75 has been shifted from stopping the dial 63, this dial is returned to the initial position by the spring 68, and is in this initial position before the float 55 starts its downward movement. Such downward movement rotates the dial by pulling downwardly on the cable 60 and thereby causes the dial to turn, which dial has indicia similar to those indicated at 77; and when the solenoids are again energized to shift the valves and the slidable aperature plate, the dial 63 will be brought to rest and the indicia marked thereon will be exposed through the apertures 72 and 74, thus giving a reading showing the rate of consumption of fuel during the depletion of the receptacle 24.

The above action continues in the above cycles so long as the vehicle is traveling for if the shaft 11 is connected to a part of the vehicle registering movement over the ground the device does not indicate the consumption of fuel when the vehicle is stationary. However, if the unit distances are made sufficiently small and the calibration of the dials made accordingly, frequent indications of the rate of the consumption of fuel may be given which are sufficient for all practical purposes.

It will be apparent that if the device is used on an aeroplane which must be continuously traveling through the air, when off the ground the rate of consumption of fuel will be in accordance with the units of distance traveled with relation to the motion through the air; and in such connection, if the aeroplane is a multi-engine type, there should be an indicator for each engine in order to show the economy of working of such engine. If the device is in a steam vessel or locomotive using steam, and liquid fuel, the device can be operated in connection with the total fuel supply, or where a number of boilers are used there may be an indicator for each boiler.

It is obvious that the moving controlling device having the shaft 11, the arm 12 and the brush 13 engaging the contacts 14 can be driven by some other part of a moving mechanism than a part connected to a vehicle registering distance; and thus my fuel consumption indicator may be connected to stationary and other similar types of engines, and thus indicate their relative economy of working in connection with the work done by such engines. Or if desired the controlling device may be interconnected with a timing mechanism operating by units of time, and thus designating the relative consumption of fuel in accordance with the time factor.

From the above description it will be seen that I have not only developed a mechanism for indicating the consumption of liquid fuel but I have developed a method of indicating fuel consumption in which, through the medium of a controlling device indicating distance of travel, amount of movement of a certain mechanism, or a time unit, an indication is obtained of the flow of liquid fuel out of a receptacle or tank, thus giving the indication desired. Or, expressed another way, the inflow and outflow of liquid fuel to receptacles or tanks is governed by a controlling device which may be operated to indicate distance of travel and the outflow of fuel from the receptacle or tank indicates on a registering mechanism the rate of consumption of such fuel.

The valves 46 and 47 may if desired be operated manually, in which case the driver of the vehicle may shift the rock arm 84 by hand and this will actuate the links 83 and hence reverse the valves. Such action may be done if the engine for instance is on an automobile or an aeroplane or running without the vehicle having any forward travel. It is obvious therefore that as no distance can be recorded, that the device would not indicate any number of units of distance per unit of fuel.

In the claims where reference is made to the relation between the units of fuel and the units of distance, this is intended to refer to the case in which the engine consuming the fuel is on a vehicle and such vehicle is traveling.

Various changes may be made in the principles of my invention without departing from the spirit thereof, as set forth in the description, drawings and claims.

I claim:

1. A liquid fuel consumption indicator comprising in combination a movable control device adapted to be actuated by a moving part of a vehicle to indicate units of distance traveled, a plurality of liquid fuel receptacles each having a separate inlet and outlet controlled by the said device, a plurality of indicators for the rate of consumption of fuel, and means to actuate each of said indicators by the outflowing fuel from each receptacle, one of said indicators showing a registration while another is making a tally.

2. A liquid fuel consumption indicator comprising in combination a controlling device adapted to indicate units of distance traveled by a vehicle, a plurality of liquid fuel receptacles, each having a separate inlet and outlet, means interconnecting said inlets and outlets with the control device to actuate same in sequence, a float for each receptacle, and separate means actuated by each float to indicate the rate of consumption of fuel.

3. A liquid fuel consumption indicator, as claimed in claim 2, one of said indicating means of the rate of consumption of fuel being held stationary while the other indicating means is registering a tally.

4. A liquid fuel consumption indicator, as claimed in claim 2, each of the indicating means of the rate of consumption of fuel having an indicating dial actuated by a cable connected to one of the floats, and means to hold one of said dials stationary while the float connected to the other dial is following the outflow of the fuel and recording a tally.

5. A liquid fuel consumption indicator comprising in combination a moving device adapted to indicate units of distance traveled of a vehicle, a plurality of liquid fuel receptacles, each having a separate inlet and outlet, electro-magnetic means controlled by said device to operate said inlets and outlets in sequence, a plurality of indicators to give the rate of consumption of fuel, and means interconnecting each indicator and each fuel receptacle to actuate one indicator while another indicator is held stationary.

6. A liquid fuel consumption indicator, as claimed in claim 5, the indicators comprising dials, each dial being connected by a cable to a float in one of the liquid fuel receptacles, one of the floats rising during the filling of the receptacle while the other float moves down during the discharge of its receptacle, and means to hold the indicator stationary which is connected to the upwardly moving float.

7. A liquid fuel consumption indicator comprising in combination a plurality of liquid fuel receptacles, each having a separate inlet and outlet, means actuated by units of distance traveled of a vehicle to open the inlet and close the outlet of each receptacle in sequence, a float in each receptacle, said float on filling a receptacle closing an inlet valve before the other receptacle is emptied, and an indicating means actuated by said floats showing the rate of consumption of fuel.

8. A liquid fuel consumption indicator, as claimed in claim 7, the indicating means comprising a plurality of rotatable dials, each dial being interconnected to a float in a receptacle, one of said dials being held stationary while its float is rising and giving a visible indication, the other dial being rotatable while its float descends through consumption of the fuel.

9. A liquid fuel consumption indicator comprising in combination a pair of liquid fuel receptacles, each having a separate inlet and outlet, a double action valve operating device to open each outlet alternately, floats in each receptacle adapted to close each inlet on the filling of a receptacle, means actuated by a unit of movement of a mechanism to control the double action valve operating device, and an indicating means interconnected with each of the floats to give an indication of the rate of consumption of fuel.

10. A liquid fuel consumption indicator comprising in combination a plurality of dials having indicia thereon, a shiftable aperture plate having apertures therethrough to expose the indicia on one dial and shut off the other, a plurality of liquid fuel receptacles, means operated by the outflow of fuel from each receptacle to operate each dial in turn, an outlet valve for each receptacle, a double acting trip device to open the valves alternately, said trip device shifting the aperture plate, means to flow fuel into said receptacles, and a control device governing the trip device.

11. A liquid fuel consumption indicator comprising in combination a pair of dials each having indicia thereon, a shiftable aperture therethrough to expose and cover indicia on each dial alternately, a pair of receptacles having outlets, a float in each receptacle, means interconnecting each float and a dial to rotate the dial on a downward movement of the float, means to return each dial on the upward movement of the float, an inlet valve to each receptacle adapted to be closed by the floats, a double acting trip mechanism to open and close each of the outlets alternately and to permit opening of each of the inlet valves alternately and to shift the aperture plate, and a control device for said double acting trip mechanism.

12. A liquid fuel consumption regulator comprising in combination a fuel supply means for a vehicle, a device actuated by the movement of the vehicle to control said fuel supply in relation to units of distance, a plurality of registers controlled by the fuel supply, each having indicia thereon, and means to expose the indicia on one of the registers and obscure the indicia on the other register while the other register is making a registration.

13. A liquid fuel consumption indicator comprising a fuel supply for the engine of a vehicle, an electro-mechanical device actuated by a unit distance of travel of the vehicle to control the fuel supply, a plurality of registers connected to the fuel supply, one of said registers being stationary and giving an indication while the other register is undergoing a registering operation.

14. A liquid fuel consumption indicator comprising in combination means to supply liquid fuel to the engine of a vehicle, electro-mechanical means operated by the movement of the vehicle through a unit of distance and controlling the operation of the fuel supply, a plurality of registers connected to the fuel supply, having two sets of indicia and means to expose one set of indicia on one of the registers and obscure the indicia on the other register while the other register is undergoing a registering operation.

15. A liquid fuel consumption indicator comprising in combination a plurality of liquid fuel receptacles having control valves to supply liquid fuel to the tanks and from the tanks to an engine, electro-mechanical means operated by the vehicle in a unit distance of travel to operate the said valves, a plurality of registers, each being operatively connected to a liquid fuel receptacle to indicate the consumption of fuel therefrom, indicia on said registers and a shiftable obscuring means to expose the indicia of one register and obscure the indicia on the other register while the other register is undergoing a registering operation.

In testimony whereof I have signed my name to this specification.

CLAUDE C. BROWN.